US00RE50779E

(19) United States
(12) Reissued Patent
Fu et al.

(10) Patent Number: US RE50,779 E
(45) Date of Reissued Patent: Feb. 3, 2026

(54) METHODS AND APPARATUS FOR LOAD AND ROUTE ASSIGNMENTS IN A DELIVERY SYSTEM

(71) Applicant: Walmart Apollo, LLC, Bentonville, AR (US)

(72) Inventors: Mingang Fu, Palo Alto, CA (US); Pushkar Raj Pande, Sunnyvale, CA (US); Amritayan Nayak, Santa Clara, CA (US); Deepak Deshpande, San Jose, CA (US); Madhavan Kandhadai Vasantham, Dublin, CA (US); Syed Aman, Santa Clara, CA (US); Deyi Zhang, Fremont, CA (US); Rohit Jain, Sunnyvale, CA (US)

(73) Assignee: Walmart Apollo, LLC, Bentonville, AR (US)

(21) Appl. No.: 18/130,226

(22) Filed: Apr. 3, 2023

Related U.S. Patent Documents

Reissue of:
(64) Patent No.: 10,775,182
Issued: Sep. 15, 2020
Appl. No.: 16/129,690
Filed: Sep. 12, 2018

(51) Int. Cl.
*G06Q 10/047* (2023.01)
*G01C 21/34* (2006.01)
(Continued)

(52) U.S. Cl.
CPC ..... *G06Q 10/047* (2013.01); *G01C 21/3415* (2013.01); *G01C 21/343* (2013.01);
(Continued)

(58) Field of Classification Search
CPC ..... G01C 21/3453; G01C 21/343; G01C 21/3446; G01C 21/3415; G06Q 10/047; G06Q 10/06393; G08G 1/096816
See application file for complete search history.

(56) References Cited

U.S. PATENT DOCUMENTS 4,862,496 A 8/1989 Kelly et al.
5,805,898 A 9/1998 Barsness et al.
(Continued)

FOREIGN PATENT DOCUMENTS

WO 02/15083 A1 2/2002

OTHER PUBLICATIONS

Xia et al., A New TS Algorithm for Solving Low-Carbon Logistics Vehicle Routing Problem with Split Deliveries by Backpack-From a Green Operation Perspective, May 2018, International Journal of Environmental Research and Public Health, vol. 15, Issue 5, pp. 949-966.

*Primary Examiner* — C. Michelle Tarae
(74) *Attorney, Agent, or Firm* — Morgan, Lewis & Bockius LLP; Manita Rawat

(57) ABSTRACT

A load and route assignment system is provided and generally includes a computing device and a database. The database may store historical inbound load data and historical outbound load data related to previous inbound and outbound loads. The computing device can obtain and aggregate the historical inbound and outbound load data from the database, and determine an optimal path based on the aggregated historical data. The optimal path, along with load attribute data, may be stored in the database as a tour template for future load executions. The computing device may use the tour templates to determine future load assignments to vehicles. The computing device may also obtain real-time load requests, and match them to one or more of a plurality of tour templates. The computing device may assign the matched real-time load requests to a vehicle for execution in accordance with the corresponding load and tour template.

20 Claims, 8 Drawing Sheets

(51) Int. Cl.
*G06Q 10/0639* (2023.01)
*G08G 1/0968* (2006.01)

(52) U.S. Cl.
CPC ..... *G01C 21/3446* (2013.01); *G01C 21/3453* (2013.01); *G06Q 10/06393* (2013.01); *G08G 1/096816* (2013.01)

(56) References Cited

U.S. PATENT DOCUMENTS 6,301,267 B1 10/2001 Ben-Ami
6,397,212 B1 5/2002 Biffar
6,409,603 B1 6/2002 Nishino et al.
6,526,349 B2 * 2/2003 Bullock ..... G01C 21/3484 73/178 R
6,857,026 B1 2/2005 Cain
7,403,988 B1 7/2008 Blouin et al.
8,352,179 B2 * 1/2013 French ..... G01C 21/3415 701/425
8,682,817 B1 3/2014 Jones et al.
8,706,397 B2 * 4/2014 Adler ..... G01C 21/3492 701/423
9,043,151 B2 5/2015 Cai et al.
9,454,634 B1 9/2016 Kukal et al.
10,607,178 B2 * 3/2020 Mauch ..... G06Q 10/0838
11,004,031 B2 * 5/2021 Shroff ..... G06N 7/01
2002/0082772 A1 * 6/2002 Okano ..... G01C 21/343 701/533
2002/0156572 A1 * 10/2002 Bullock ..... G01C 21/3484 340/988
2002/0181445 A1 12/2002 Beer
2003/0126246 A1 7/2003 Blouin et al.
2004/0030572 A1 * 2/2004 Campbell ..... G01C 21/26 705/333
2005/0015315 A1 * 1/2005 Starkowsky ..... G06Q 10/06 705/28
2005/0025058 A1 2/2005 Chaudhuri et al.
2007/0086361 A1 4/2007 Allan et al.
2007/0156372 A1 * 7/2007 Christ ..... G06Q 10/087 702/158
2007/0221791 A1 9/2007 Voelk
2008/0065262 A1 * 3/2008 Gottlieb ..... G06Q 10/08 700/213
2008/0154878 A1 6/2008 Rose et al.
2008/0243789 A1 10/2008 Kussmaul et al.
2008/0276034 A1 11/2008 Harding et al.
2009/0319172 A1 * 12/2009 Almeida ..... G01C 21/3484 726/4
2010/0106539 A1 4/2010 Kenefic
2010/0205026 A1 * 8/2010 Malitski ..... G06Q 10/06312 705/7.23
2011/0055065 A1 3/2011 Brenner
2011/0224898 A1 * 9/2011 Scofield ..... G08G 1/0104 701/532
2012/0191338 A1 * 7/2012 French ..... G01C 21/3453 701/400
2012/0200430 A1 8/2012 Spahl
2013/0018574 A1 * 1/2013 Adler ..... G01C 21/3492 701/527
2014/0039964 A1 * 2/2014 Sengupta ..... G06Q 10/08 705/7.25
2014/0058971 A1 2/2014 Muppirala et al.
2014/0100992 A1 * 4/2014 Shi ..... G06Q 30/0635 705/26.81
2014/0188574 A1 * 7/2014 Luca ..... G09B 7/00 705/7.39
2014/0214716 A1 * 7/2014 Mauch ..... G06Q 10/0838 705/333
2015/0120600 A1 * 4/2015 Luwang ..... G06Q 10/08355 705/338
2015/0161556 A1 6/2015 Jena
2016/0300186 A1 10/2016 Scharaswak et al.
2016/0328669 A1 * 11/2016 Droege ..... G06Q 10/06311
2016/0335593 A1 11/2016 Clarke et al.
2017/0178070 A1 * 6/2017 Wang ..... G06Q 10/063116
2017/0262799 A1 9/2017 Shroff et al.
2017/0262804 A1 * 9/2017 Shroff ..... G06Q 10/08
2018/0211218 A1 7/2018 Berdinis et al.
2018/0215376 A1 8/2018 Kuhara
2018/0268371 A1 9/2018 Van Hentenryck et al.
2018/0315319 A1 11/2018 Spector et al.
2019/0114564 A1 4/2019 Ferguson et al.
2019/0383623 A1 12/2019 Aich et al.

* cited by examiner

METHODS AND APPARATUS FOR LOAD AND ROUTE ASSIGNMENTS IN A DELIVERY SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is related to U.S. patent application Ser. No. 16/129,708, filed simultaneously on Sep. 12, 2018, which is herein incorporated by reference.

TECHNICAL FIELD

The disclosure relates generally to delivery systems and, more specifically, to load and route assignments in a goods delivery system.

BACKGROUND

At least some known systems and industries provide delivery services to their customers. For example, some companies in various industries provide the delivery of goods to their customers, such as the delivery of grocery items by grocers. In particular, the delivery of grocery items has increasingly become a method by which consumers obtain their grocery needs. To deliver goods, many of these companies employ delivery systems that include delivery vehicles. The delivery systems may include the scheduling and assignment of delivery orders to delivery vehicles. For example, a customer that purchases grocery items online may have the grocery items delivered to their home in a delivery vehicle.

These delivery vehicles, however, impose various costs on companies. For example, there are costs associated with purchasing or renting the vehicles, maintaining the vehicles, purchasing fuel for the vehicles, as well as employing drivers to drive the vehicles, just to name a few. In addition, delivery systems must determine delivery routes and schedules for delivery trucks to deliver goods. The scheduling of the delivery of goods may also include the assignment of the goods to delivery vehicles for delivery. A delivery truck may receive a load assignment, for example, that includes the delivery of multiple orders. In addition, delivery systems may determine delivery routes that the delivery vehicles may travel to deliver ordered goods. As the number of delivery orders increase, the determination of load assignments and delivery routes, along with delivery costs, may increase as well. As such, there are opportunities to improve delivery systems and, in particular, to improve load and route assignments in a goods delivery system.

SUMMARY

The embodiments described herein may allow for the more efficient delivery of goods. For example, the embodiments described herein may allow for a reduction in the time required to deliver goods to a customer. Additionally, the embodiments described herein may allow for a reduction in the costs associated with delivering the goods to a customer.

For example, the amount of miles driven by delivery trucks with little or no cargo (e.g., "empty miles") may be reduced, thus reducing delivery vehicle costs, such as fuel costs. Other benefits would also be recognized by those skilled in the art.

In some examples, a system includes a computing device configured to aggregate historical inbound data related to a plurality of inbound loads, based on at least one similar attribute of the plurality of inbound loads, to determine at least two inbound nodes. The computing device may also be configured to aggregate historical outbound data related to a plurality of outbound loads, based on at least one similar attribute of the outbound loads, to determine at least one outbound node. The computing device may further be configured to construct a first determination that there is at least a first pre-defined amount of time to travel between locations associated with the at least two inbound nodes while still satisfying at least a first time window attribute of at least one of the two inbound nodes. The computing device may also be configured to determine at least a first directed edge between the at least two inbound nodes based on the first determination.

The computing device may further be configured to construct a second determination that there is at least a second pre-defined amount of time to travel between locations associated with an outbound node at least one of the two inbound nodes while still satisfying at least a second time window attribute of at least one of the outbound node and the two inbound nodes. The computing device may also be configured to determine at least a second directed edge between the outbound node and the two inbound nodes based on the second determination.

The computing device may be configure to determine a plurality of paths between the locations associated with the outbound node and the two inbound nodes based at least on the first directed edge and the second directed edge. The computing device may also be configured to determine an optimal path based on the plurality of paths. The optimal path may be, for example, a path a delivery vehicle may pursue to execute one or more loads.

In some examples, a method by a computing device includes aggregating historical inbound data related to a plurality of inbound loads based on at least one similar attribute of the plurality of inbound loads to determine at least two inbound nodes. The method may further include aggregating historical outbound data related to a plurality of outbound loads based on at least one similar attribute of the outbound loads to determine at least one outbound node. The method may also include constructing a first determination that there is at least a first pre-defined amount of time to travel between locations associated with the two inbound nodes while still satisfying at least a first time window attribute of the two inbound nodes. The method may further include determining at least a first directed edge between the two inbound nodes based on the first determination.

The method may include constructing a second determination that there is at least a second pre-defined amount of time to travel between locations associated with at least one outbound node and the two inbound nodes while still satisfying at least a second time window attribute of at least one of the outbound and inbound nodes. The method may also include determining at least a second directed edge between the outbound node and at least one of the two inbound nodes based on the second determination.

The method may include determining a plurality of paths between the locations associated with the outbound node and the two inbound nodes based at least on the first directed edge and the second directed edge. The method may also include determining an optimal path based on the plurality of paths.

In some examples, a non-transitory, computer-readable storage medium comprises executable instructions that, when executed by one or more processors, cause the one or more processors to aggregate historical inbound data related to a plurality of inbound loads based on at least one similar attribute of the plurality of inbound loads to determine at least two inbound loads, and aggregate historical outbound data related to a plurality of outbound loads based on at least one similar attribute of the outbound loads to determine at least one outbound node.

The executable instructions, when executed by the one or more processors, may also cause the one or more processors to construct a first determination that there is at least a first pre-defined amount of time to travel between locations associated with the at least two inbound nodes while still satisfying at least a first time window attribute of at least one of the two inbound nodes. The executable instructions, when executed by the one or more processors, may also cause the one or more processors to determine at least a first directed edge between the at least two inbound nodes based on the first determination.

The executable instructions, when executed by the one or more processors, may also cause the one or more processors to construct a second determination that there is at least a second pre-defined amount of time to travel between locations associated with the at least one outbound node and at least one of the at least two inbound nodes while still satisfying at least a second time window attribute of at least one of the at least one outbound node and the at least two inbound nodes. The executable instructions, when executed by the one or more processors, may also cause the one or more processors to determine at least a second directed edge between the at least one outbound node and the at least one of the two inbound nodes based on the second determination.

The executable instructions, when executed by the one or more processors, may also cause the one or more processors to determine a plurality of paths between the locations associated with the at least one outbound node and the at least two inbound nodes based on the at least first directed edge and the at least second directed edge. The executable instructions, when executed by the one or more processors, may also cause the one or more processors to determine an optimal path based on the plurality of paths.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
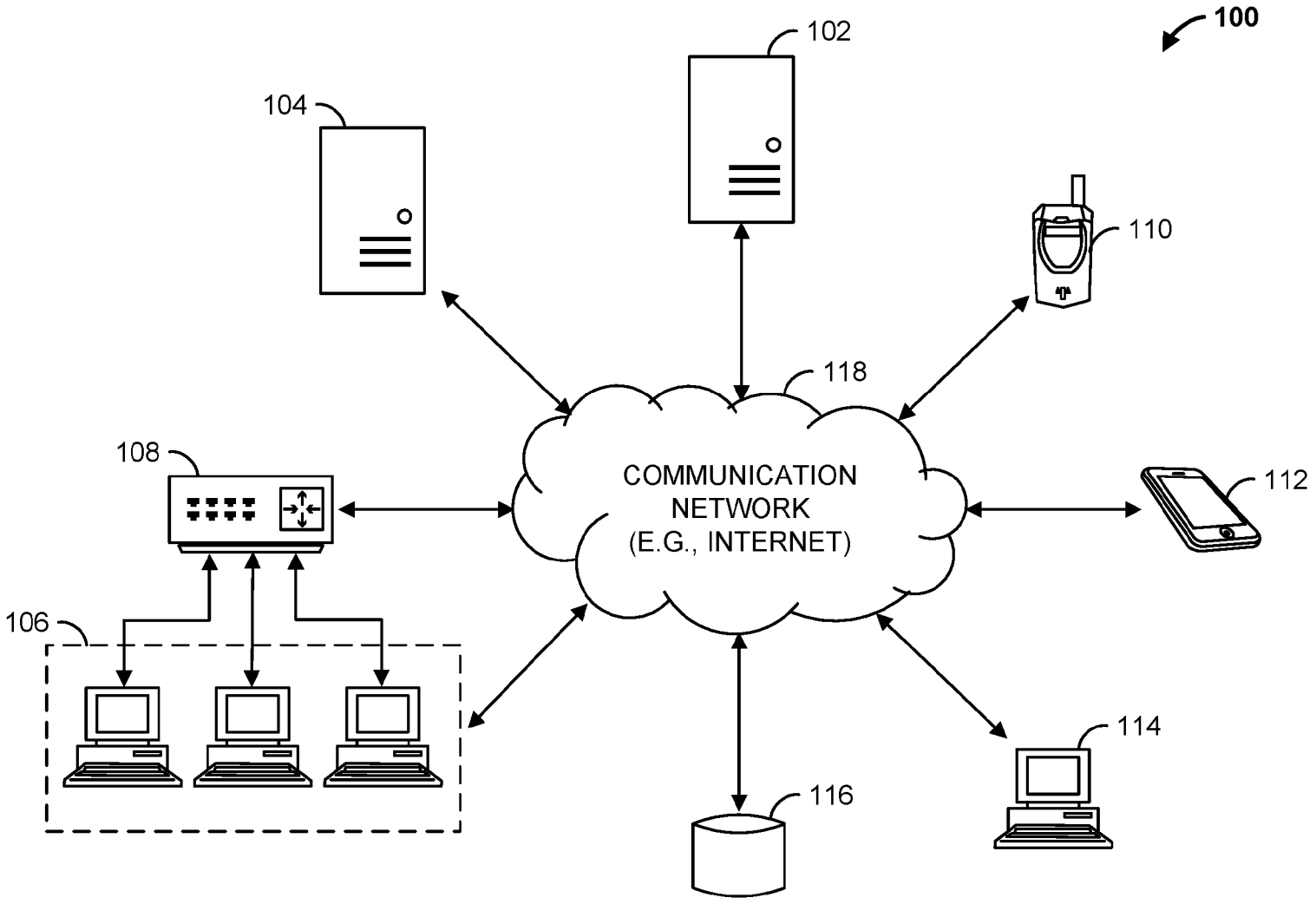
FIG. 1 is a block diagram of a load and route assignment system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of load and route assignment system 100 that includes a load and route assignment computing device 102 (e.g., a server, such as an application server), a web hosting device (e.g., a web server) 104, workstation(s) 106, database 116, and multiple delivery computing devices 110, 112, 114. Load and route assignment computing device 102, workstation(s) 106, web hosting device 104, and database 116 may be operated by a retailer, such as a grocery store. Delivery computing devices 110, 112, 114 may be computing devices operated by delivery personnel, such as dispatchers and truck drivers, of the retailer.

Load and route assignment computing device 102, web hosting device 104, and multiple delivery computing devices 110, 112, 114 can each be any suitable computing device that includes any hardware or hardware and software combination for processing and handling information. In addition, each may transmit data to, and receive data from, communication network 118. For example, each of these devices can be a computer, a workstation, a laptop, a mobile device such as a cellular phone, a cloud-based server, or any other suitable device. Each can include one or more processors, one or more field-programmable gate arrays (FPGAs), one or more application-specific integrated circuits (ASICs), one or more state machines, digital circuitry, or any other suitable circuitry.

Although FIG. 1 illustrates three delivery computing devices 110, 112, 114, load and route assignment system 100 can include any number of delivery computing devices 110, 112, 114. Similarly, load and route assignment system 100 can include any number of workstation(s) 106, load and route assignment computing devices 102, web servers 104, and databases 116.

Workstation(s) 106 are operably coupled to communication network 118 via router (or switch) 108. For example, workstation(s) 106 can communicate with load and route assignment computing device 102 over communication network 118. The workstation(s) 106 can allow for the configuration and/or programming of load and route assignment computing device 102, such as the controlling and/or programming of one or more processors of load and route assignment computing device 102 (described further below with respect to FIG. 2). The workstation(s) 106 may also display a graphical user interface (GUI) that provides an interface to one or more functions of load and route assignment computing device 102. For example, workstation(s) 106 may allow a user to request data from load and route assignment computing device 102 for display.

Load and route assignment computing device 102 is operable to communicate with database 116 over communication network 118. For example, load and route assignment computing device 102 can store data to, and read data from, database 116. Database 116 can be a remote storage device, such as a cloud-based server, a memory device on another application server, a networked computer, or any other suitable remote storage. Although shown remote to load and route assignment computing device 102, in some examples database 116 can be a local storage device, such as a hard drive, a non-volatile memory, or a USB stick.

Communication network 118 can be a WiFi network, a cellular network such as a 3GPP® network, a Bluetooth® network, a satellite network, or any other suitable network. Communication network 118 can provide access to, for example, the Internet.

Load and route assignment computing device 102 can also communicate with first delivery computing device 110, second delivery computing device 112, and third delivery computing device 114 over communication network 118. For example, load and route assignment computing device 102 can receive data (e.g., messages) from, and transmit data to, first delivery computing device 110, second delivery computing device 112, and third delivery computing device 114.

Load and route assignment system 100 may allow for the scheduling and assignment of loads to vehicles based on historical load data. A load may be goods a vehicle may be delivering. For example, a vehicle may need to deliver a load to a supercenter, or a distribution center from a warehouse. As another example, a vehicle may need to pickup good from a location, such as a supercenter, for delivery to a customer's home. The load consists of the goods on the vehicle. The load may consist of one or more orders, for example. An inbound load may consist of a load being delivered to a supercenter, a distribution center, or a grocery store, for example. An outbound load may be a load being delivered from the supercenter, distribution center, or grocery store to a customer's home, for example.

Database 116 may store historical inbound load data and historical outbound load data related to previous inbound and outbound loads. The historical inbound load data and historical outbound load data may include attribute data related to previous loads, such as origin and destination data, as discussed further below. Load and route assignment computing device 102 may aggregate the historical inbound and outbound load data from the database, and determine an optimal path for a vehicle to travel to execute future load requests based on the aggregated historical data. The optimal path, along with load attribute data, may be stored in database 116 as a tour template for future load request executions. Load and route assignment computing device 102 may use the tour templates to determine future load assignments to vehicles. Load and route assignment computing device 102 may also obtain live (e.g., real-time) load requests, and match them to one or more of a plurality of tour templates. Load and route assignment computing device 102 may assign the matched live loads to a vehicle for execution in accordance with the corresponding load and tour template, as described further below. For example, live loads may be assigned to a vehicle in real-time.

Figure 2:
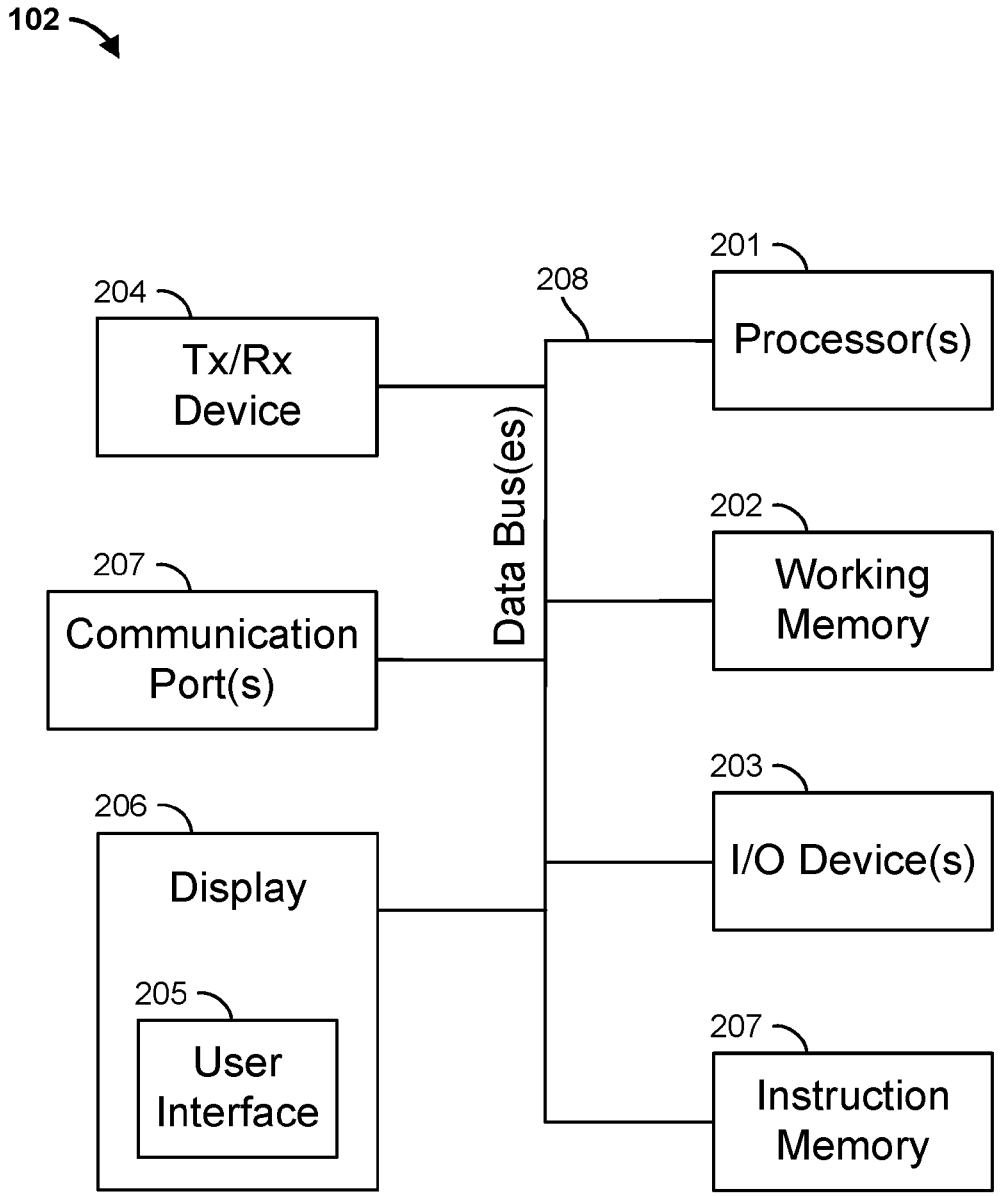
FIG. 2 is a more detailed block diagram of the load and route assignment computing device of FIG. 1 in accordance with some embodiments.

FIG. 2 illustrates the load and route assignment computing device 102 of FIG. 1. Load and route assignment computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of load and route assignment computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as historical data related to previous loads.

Display 206 can display user interface 205. User interfaces 205 can enable user interaction with load and route assignment computing device 102. For example, user interface 205 can be a user interface for an application that allows for the viewing of historical data. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 load and route assignment computing device 102 will be operating in. Processor(s) 201 is operable to receive data from, or send data to, a network, such as communication network 118 of FIG. 1, via transceiver 204.

Figure 3:
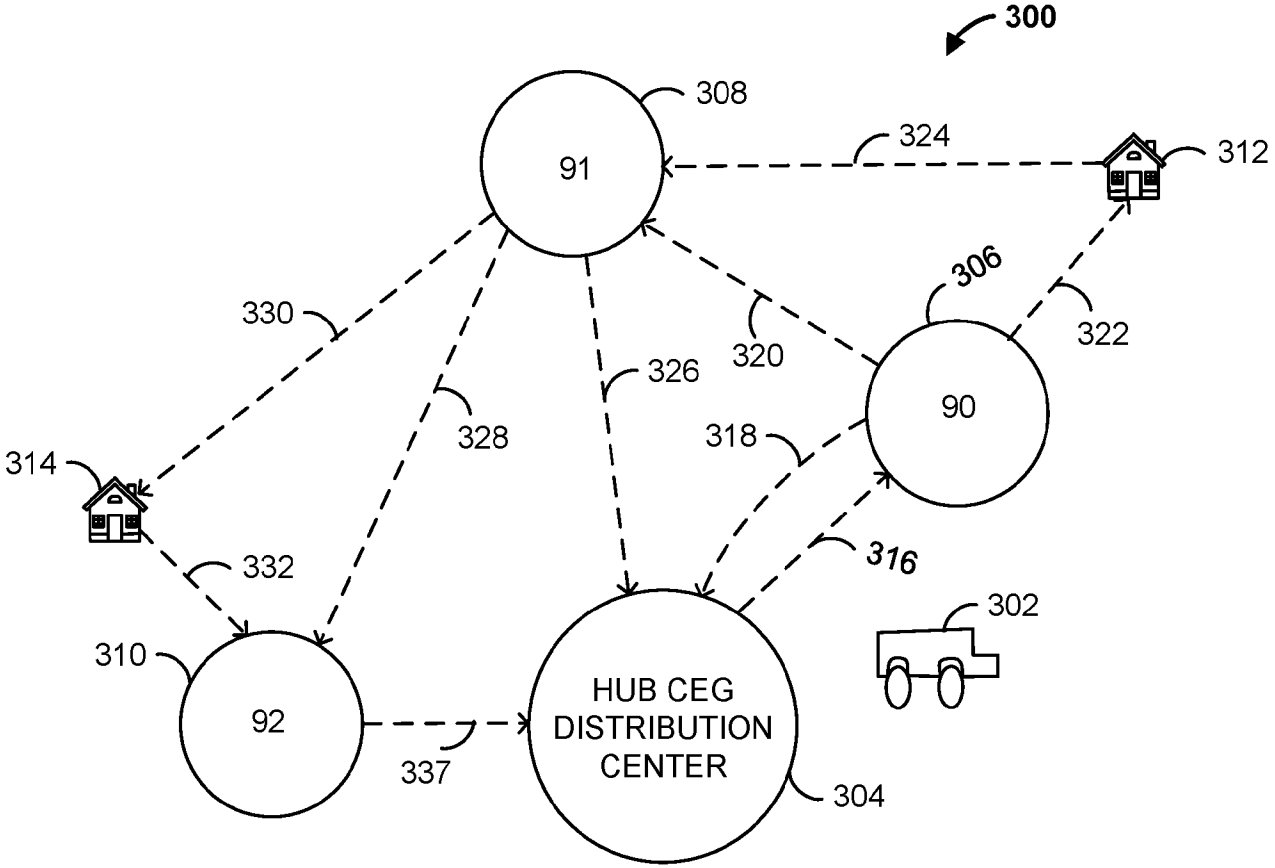
FIG. 3 is a system diagram of a delivery vehicle progressing along routes by direction of the load and route assignment system of FIG. 1 in accordance with some embodiments.

FIG. 3 is a system diagram of a delivery vehicle 302 progressing along routes by direction of the load and route assignment system 100 of FIG. 1. In this example delivery vehicle 302 is scheduled to progress along route 316 to make a delivery of goods from hub 304 to store S0 306. Assume that a live load request (e.g., a new delivery order) is received while delivery truck 302 is progressing along route 310. Typically, delivery truck 302 would return to along route 318 from store S0 306 to hub 304 before being assigned the live load request. However, load and route assignment system 100 may assign the live load request to delivery vehicle 302 in real-time.

For example, the live load request may be for a delivery of goods to customer 312. As such, load and route assignment system 100 may assign the live load request to delivery vehicle 302 such that, after the delivery of goods to store S0 306, delivery vehicle 302 will proceed along route 322 to customer 312 for the delivery of ordered goods. The goods delivered to customer 312 may be loaded on to delivery truck 302 from goods located at store S0 306.

Assume a second live load request is received by load and route assignment system 100 for the delivery of goods to, or pickup of goods from, store S1 while delivery truck 302 is proceeding along route 316 or route 322. Load and route assignment system 100 may assign this second live load request in real-time to delivery truck 302. Delivery truck 302 may proceed along route 324 if goods were first delivered to customer 312, or may otherwise proceed along route 320 from store S0 306 to store S1 308, to execute the second live load request.

If no new live load requests are received before delivery truck 302 leaves store S1 308, delivery truck 302 may proceed along route 326 to return to hub 304. However, if a third live load request is received before delivery truck departs from store S1 308 (e.g., while proceeding along routes 320 or 324), load and route assignment system 100 may assign the third live load request to delivery truck 302. For example, if the third live load request is for a delivery of goods to customer 314, delivery truck 302 may load the ordered goods at store S1 and proceed along route 330 to deliver them to customer 314. If, while proceeding along route 330 to customer 314, or when leaving from customer 314, a fourth live load request is received for the delivery of goods to, or pickup of goods from, store S2 310, load and route assignment system 100 may assign the fourth live load request to delivery truck 302 in real-time. In this case, delivery truck 302 may proceed along route 332 to execute the fourth live load request.

If the third live load request is for the delivery of goods to, or pickup of goods from, store S2 310, delivery truck 302 may proceed along route 328 from store S1 308 to reach store S2 310 to execute the third live load request. Delivery truck 302 may then proceed along route 334 to return to hub 304.

Figure 4:
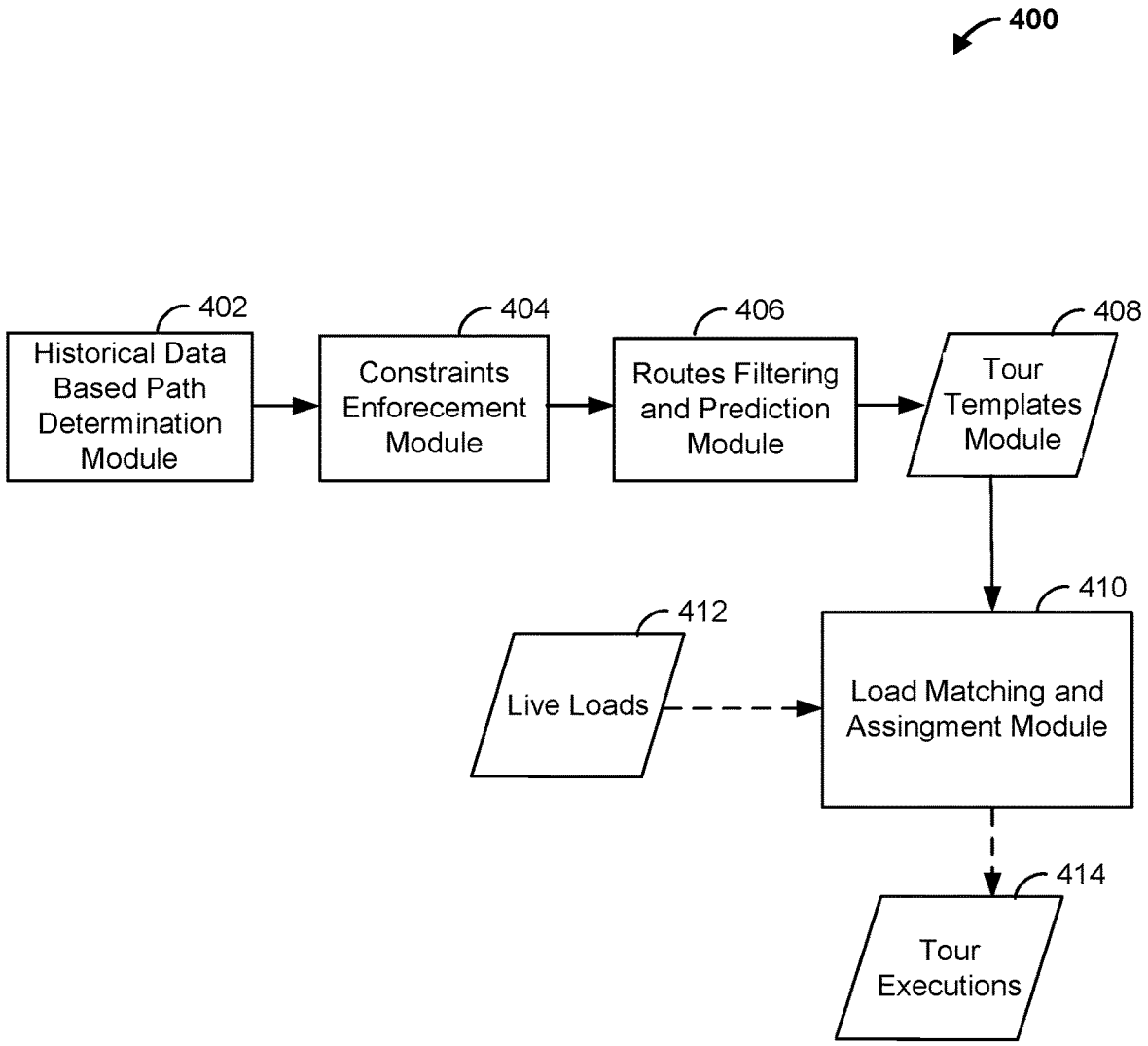
FIG. 4 is a block diagram of tour generation and load assignment modules that may be carried out by the load and route assignment computing device of FIG. 1 in accordance with some embodiments.

FIG. 4 is a block diagram of tour generation and load assignment modules that may be carried out by the load and route assignment computing device 102 of FIG. 1. For example, the modules may be software based modules that are stored in instruction memory 207 and are executed by processor(s) 201 of the load and route assignment computing device 102.

Historical data based path determination module 402 uses historical data related to previous loads to determine (e.g., generate) optimal paths (e.g., delivery routes) that may be assigned to future loads. The historical data may include inbound load data and outbound load data from previous loads. Inbound loads are loads being delivered to a supercenter, distribution center, grocery store, warehouse, or the like where goods are stored. Outbound loads are loads that are delivered to customers, for example. The historical data may also include attributes associated with each previous load. For example, the historical data may include one or more of the attributes of an origin, a destination, a destination location type (e.g., distribution center, store, customer home, etc.), pickup due time window, pickup ready time window, drop off due time window, drop off ready time window, load requirements such as a commodity requirement, the time from the origin to the destination of the previous load, the number of stops made, and the distance from the origin to the destination of the previous load, for example.

Figure 5:
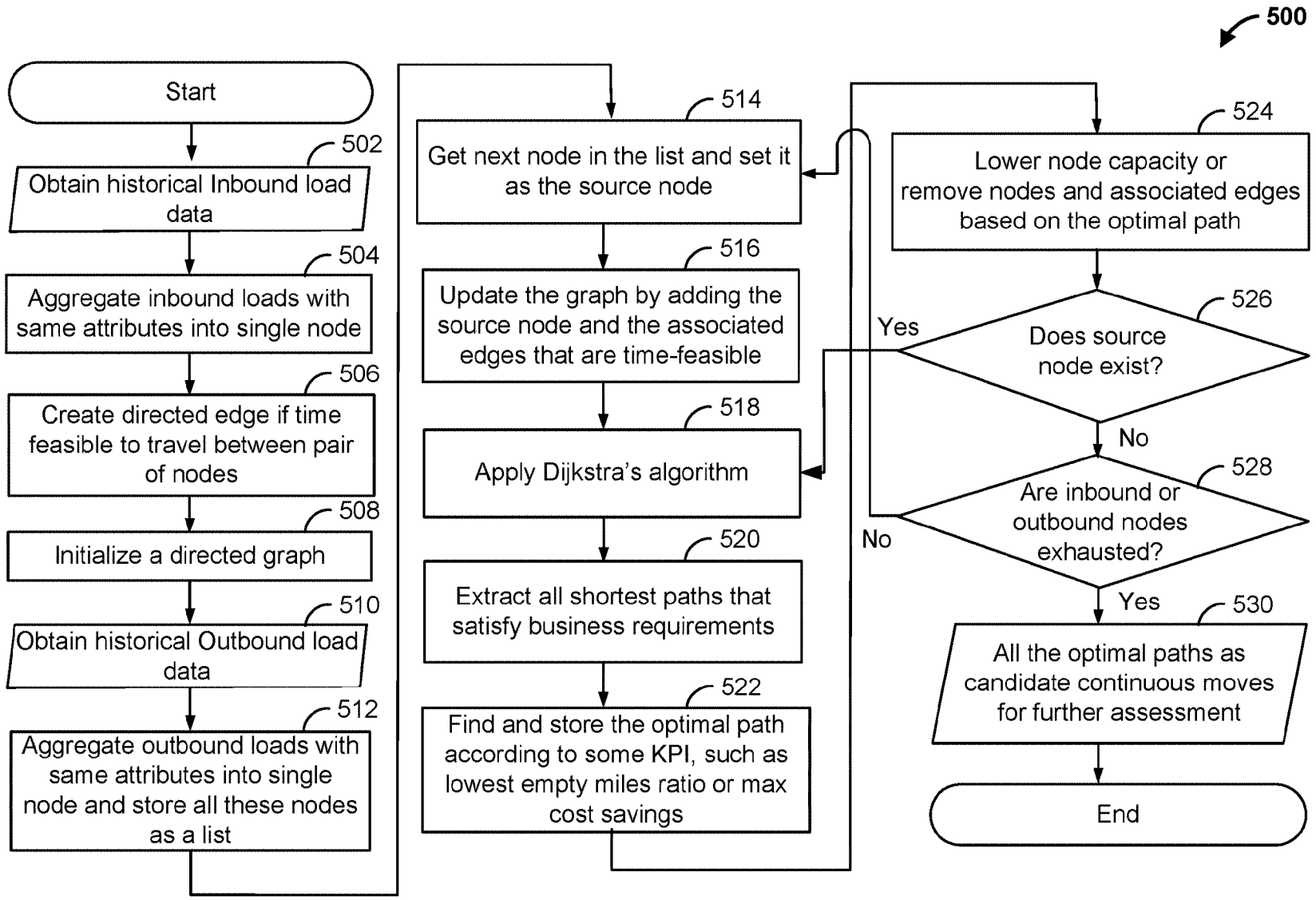
FIG. 5 is a flowchart of an example method to generate paths that may be implemented by the historical data based path determination module of FIG. 4 in accordance with some embodiments.

The historical data may be stored in database 116 of FIG. 1. For example, historical data based path determination module 402 may obtain inbound and outbound load data associated with previous loads from database 116, and generate optimal paths based on the inbound and outbound load data. As described further below, some of these optimal paths may used to generate tour templates by the tour templates module 408, which are then assigned to future loads by the load matching and assignment module 410. FIG. 5 describes a more detailed description of the functions of an example data based path determination module 402.

Constraints enforcement module 404 obtains optimal paths from historical data based path determination module 402 to determine whether the optimal paths comport with one or more requirements, such as requirements imposed by the United States Department of Energy (DOE). For example, a rule may require that no more than a maximum number of hours be worked by a vehicle driver within a 24-hour period. As another example, a rule may require a minimum amount of resting hours within a 24-hour period. The constraints enforcement module 404 ensures that any optimal paths received comply with any number of rules. For example, for a given optimal path, constraints enforcement module 404 will determine if the optimal path violates the rule. If the optimal path does not violate the rule, constraints enforcement module 404 may provide the optimal path to the routes filtering and prediction module 406. Otherwise, if the optimal path does violate the rule, constraints enforcement module 404 may not provide the optimal path to the routes filtering and prediction module 406. In some examples, constraints enforcement module 404 provides an optimal path to the routes filtering and prediction module 406 only if none of a plurality of rules are violated. In some examples, a user is able to enable (e.g., select) which rules constraints enforcement module 404 should enforce.

Routes filtering and protection module 406 obtains optimal paths from constraints enforcement module 404, and determines a ranking of the optimal paths. The ranking of optimal paths is based on historical data related to previous loads. A higher ranking indicates a path that has been more often taken that a lower ranked path. For example, routes filtering and protection module 406 may determine how often each of a plurality of optimal paths has been taken over a period of time (e.g., over the past month, year-to-date, same month in the previous year, etc.) by obtaining data related to previous loads from database 116 of FIG. 1. Routes filtering and protection module 406 may assign a ranking to each optimal path, where the ranking is based on how often the optimal path was taken over the period of time. An optimal path that was taken more often than another optimal path over that period of time would have a higher ranking than that other optimal path. In some examples, the optimal paths are stored in an array, where the optimal paths are ordered by rank (e.g., higher rankings appear first, lower rankings appear first, etc.). Routes filtering and protection module 406 may then provide the ranked optimal paths to tour templates module 408.

Tour templates module 408 generates tour templates from the ranked optimal paths received from routes filtering and protection module 406. Each tour template may include a sequence of optimal paths, including outbound and inbound optimal paths, that a vehicle may use to execute loads (e.g., deliver or pickup goods contained within a load). Tour templates module 408 may generate a given tour template based on historical data related to previous loads.

In some examples, tour templates module 408 generates a tour template with no more than a maximum number of outbound optimal paths, and no more than a maximum number of inbound optimal paths. For example, tour templates module 408 may require no more than one outbound optimal path, and no more than four inbound optimal paths per tour template. In another example, tour templates module 408 requires that the first optimal path is an outbound optimal path, and subsequent paths are inbound optimal paths. In some examples, tour templates module 408 requires that each tour have no more than a maximum number of optimal paths (e.g., 5, such as 1 outbound optimal path, and 4 inbound optimal paths). Tour templates module 408 provides the generated tour templates to load matching and assignment module 410.

Load matching and assignment module 401 assigns live loads 412 (e.g., real-time loads) to tour templates received from tour templates module 408 to generate tour executions 414. The tour templates, for example, are placeholders waiting to be assigned with one or more live loads for load execution (e.g., the transport of good from one location to another). A live load 412 is a load that needs to be executed. For example, a live load 412 may include goods that customers have ordered and need delivery now or in the future. When a tour template has been assigned to one or more live loads 412 and is ready for execution, the generated tour execution 414 is assigned to a vehicle. The vehicle may proceed along a route defined by the tour execution 414. For example, if the tour execution first includes an outbound path and then four inbound paths for the delivery or pickup of goods, the vehicle will proceed first along the outbound path, and then along the four inbound paths, delivering or picking up goods as required by the tour execution 414. A more detailed description of the functions of an example load matching and assignment module 401 is provided with respect to FIG. 6.

FIG. 5 is a flowchart of an example method to generate optimal paths that may be implemented by the historical data based path determination module 402 of FIG. 4. Beginning with step 502, historical inbound load data is obtained. The historical inbound load data may include data for previous inbound loads that were executed over a period of time (e.g., over the last month, year, year-to-date, same month in the previous year, etc.). The historical inbound data may also include one or more attributes associated with each inbound load.

At step 504, historical inbound load data for inbound loads that have the same one or more attributes is aggregated (e.g., combined) into a single inbound node. For example, inbound loads with the same origin and destination may be aggregated into one inbound node. In some examples, inbound loads with the same origin, destination, as well as overlapping pickup due time windows, pickup ready time windows, drop off due time windows, and/or drop off ready time windows are aggregated into one inbound node. For example, inbound loads with pickup time windows that overlap by a minimum amount of time, as well as drop off time windows that overlap by a minimum amount of time, may be aggregated into one inbound load. As such, in some examples, a plurality of inbound nodes are generated.

Each inbound node is associated with a maximum capacity. The capacity is based on the number of inbound loads associated with the node. For example, if historical inbound load data for 3 inbound loads was aggregated, then the inbound node capacity would be 3.

At step 506, a "directed edge" is created between two inbound nodes if there is a sufficient amount of time to travel between locations associated with the two inbound loads while still satisfying at least a first time window attribute of at least one of the two inbound loads. For example, a directed edge may be created between two inbound loads if it is feasible in time to travel from the destination of one inbound node to the origin of the other inbound node within the drop off and pickup time window attributes associated with the inbound loads of each inbound node.

A sufficient amount of time may be a pre-defined amount of time. For example, a sufficient amount of time to travel from a location of one inbound node to a location associated with another inbound node may be determined by determining the distance between two locations, such as by using a global positioning system (GPS). Based on the distance and the average speed of a delivery vehicle, for example, a sufficient amount of time may be determined. In some examples, traffic conditions during the scheduled time of travel between the locations of the inbound load may be used to determine what would be a sufficient amount of time. For example, a real-time traffic system may be employed. Other methods of determining a sufficient amount of time between two locations is also contemplated.

For example, assume one inbound node is associated with inbound loads with a same origin, destination, and drop off due time window. Also assume that a second inbound node is associated with inbound loads with a same origin, destination, and pickup due time window. If a vehicle can begin travelling from the destination of the first inbound node at the end of the drop off due time window, and reach the origin of the second inbound node within the pickup due time window, then a directed edge is created between the two inbound nodes. For example, the two inbound nodes are then linked.

As another example, assume that a first inbound node is associated with inbound loads with a same origin, destination, and pickup due time window. Also assume that a second inbound node is associated with inbound loads with a same origin, destination, and drop off due time window. If a vehicle can begin travelling from the destination of the first inbound node at the end of the pickup due time window, and reach the origin of the second inbound node within the drop off due time window, then a directed edge is created between the two nodes. A similar determination is made between all inbound nodes.

At step 508, a graph is generated based on the directed edges created between inbound loads at step 506. The graph may be initialized.

At step 510, historical outbound load data is obtained. The historical outbound load data may include data for previous outbound loads that were executed over a period of time (e.g., over the last month, year, year-to-date, same month in the previous year, etc.). The historical outbound data may also include one or more attributes associated with each outbound load.

At step 512, historical outbound load data for outbound loads that have the same one or more same attributes is aggregated (e.g., combined) into a single outbound node. For example, outbound loads with the same origin and destination may be aggregated into one outbound node. In some examples, outbound loads with the same origin, destination, as well as overlapping pickup due time windows, pickup ready time windows, drop off due time windows, and drop off ready time windows are aggregated into one outbound node.

As such, in some examples, a plurality of outbound nodes are generated. Each outbound node is associated with a capacity. The capacity is based on the number of outbound loads associated with the node. For example, if historical outbound load data for 3 outbound loads was aggregated, then the outbound node capacity would be 3. The outbound nodes may be stored as a list.

At step 514, an outbound node is set as an outbound source node. The outbound source node may be, for example, the next outbound node in an outbound node list.

At step 516, the graph is updated by adding the outbound source node and determining directed edges between the outbound source node and any inbound nodes in the graph. Similar to step 506, a "directed edge" is created between the outbound source node and an inbound node if there is a sufficient amount of time to travel between locations associated with the outbound source node and the inbound load while still satisfying at least a time window attribute of at least one of the outbound source node and inbound node. For example, a directed edge may be created it is feasible to travel from the destination of the outbound source node to the origin of the inbound node within the drop off and pickup time window attributes associated with the outbound and inbound loads of the outbound source node and inbound nodes, respectively.

At step 518, the shortest paths between the locations associated with the outbound source node and the inbound nodes are found. For example, an algorithm, such as Dijkstra's algorithm, may be used to find the shortest path between all nodes.

At step 520, a determination is made as to whether the shortest paths found in step 518 satisfy one or more rules, such as business requirements. For example, one rule may require a path to be associated with at least a minimum number of loads, such as two. Thus, paths that do not include the minimum number of loads are removed from the graph. Another rule may require a maximum number of loads, such as five, per path. Any paths with a greater number of loads are removed from the graph. Yet another rule may require a maximum number of outbound loads, and a maximum number of inbound loads.

At step 522, an optimal path of the remaining paths is determined based on a Key Performance Indicator (KPI). The optimal path with the most favorable KPI is determined. For example, the optimal path with the most favorable KPI is selected and all other paths are removed from the graph.

One KPI may be an empty miles ratio. The empty miles ratio KPI may be determined by dividing the number of unloaded miles by the addition of unloaded miles and loaded miles, as shown below in equation 1.

$$\text{EMR}=\text{unloaded miles}/(\text{unloaded miles}+\text{loaded miles}) \qquad \text{Eq. 1}$$

Unloaded miles may be the number of miles that would be drive by a vehicle along the associated path with little or no cargo. Loaded miles may be the number of miles driven by the vehicle with cargo. For example, miles between any two consecutive loads are driven with an empty truck and are counted towards unloaded miles. The miles between any pickup and drop off location in a load are counted as loaded miles, as a truck would be driving cargo from the pickup location to the drop off location.

Another KPI may be the cost savings per path. For example, the cost savings for each path may be calculated as shown below in equation 2.

$$\text{Cost savings}=\text{sum of individual load costs}-(\max((\text{rate-per-mile}*\text{total mileage}),\text{minimum charge})+\text{stop charge}) \qquad \text{Eq. 2}$$

The sum of individual load costs is the costs of all loads associated with the associated path. The rate-per-mile corresponds to the amount per mile charged to a customer for the delivery of goods, and the total mileage includes the total number of miles to be driven along the associated path. The minimum charge is the minimum amount charged to a customer for the pickup and delivery of the associated loads. The stop charge is the amount charged to a customer per truck stop (e.g., for every destination).

At step 524, the inbound node capacity for each remaining inbound node in the graph is compared to the maximum inbound capacity for that inbound node to determine if the inbound node can include any more inbound loads. For example, a maximum capacity for each remaining inbound node is reduced by the number of inbound loads associated with each remaining inbound node. If the capacity for the inbound node reaches no capacity (e.g., 0), then the inbound node is removed along with any associated directed edges along the optimal path.

Similarly, the outbound node capacity for the outbound source node in the graph is compared to the maximum outbound capacity for that outbound source node to determine if the outbound source node can include any more outbound loads. If the capacity for the outbound source node reaches no capacity (e.g., 0), then the outbound source node is removed along with any associated directed edges along the optimal path.

At step 526, a determination is made as to whether the outbound source node has been removed from the graph (e.g., the outbound source node has no capacity). If the outbound source node has been removed from the graph, the method proceeds to step 528. Otherwise, the method proceeds back to step 518.

At step 528, a determination is made as to whether there are any inbound nodes or outbound nodes remaining. For example, a determination as to whether any outbound nodes remain may be performed by determining whether there are any outbound nodes remaining in the outbound node list generated in step 514. If there are any more inbound or outbound loads, the method proceeds back to step 514, where the next outbound load is set as the outbound source node. Otherwise, if there are no more inbound or outbound loads, the method proceeds to step 530, where all remaining optimal paths are provided.

Figure 6:
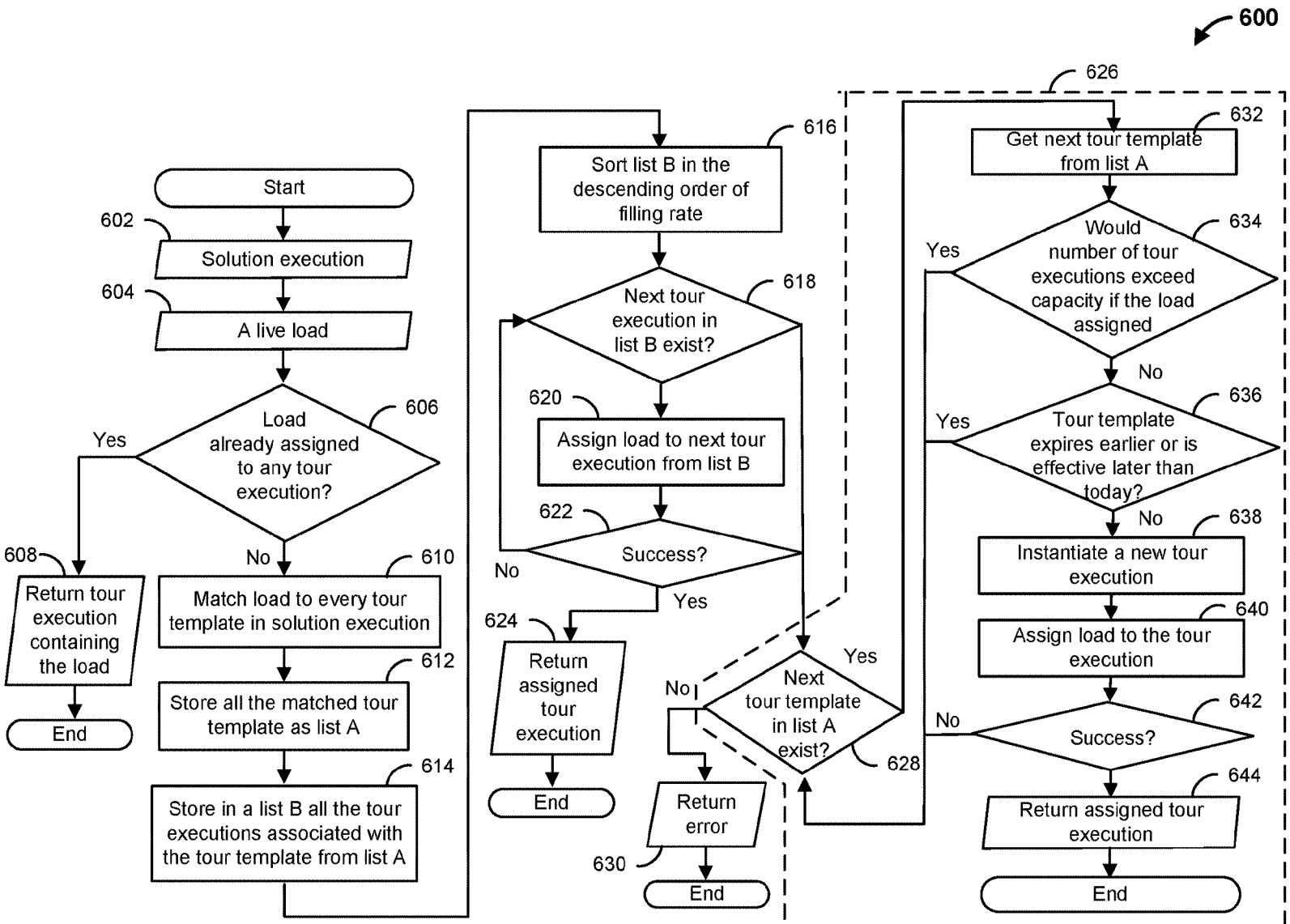
FIG. 6 is a flowchart of an example method to generate tour executions that may be implemented by the load matching and assignment module of FIG. 4 in accordance with some embodiments.

FIG. 6 is a flowchart of an example method to generate tour executions that may be implemented by the load matching and assignment module of FIG. 4. The tour executions may be assigned to a delivery vehicle to execute loads. Beginning at step 602, a solution execution is obtained. The solution execution includes one or more tour templates, each tour template with an associated tour execution yet to be assigned. For example, the solution execution may be a sequence of pairs, where each pair includes a tour template and a tour execution yet to be assigned. At step 604, a live load is received. The live load is a load ready to be assigned for execution.

At step 606, a determination is made as to whether the live load has already been assigned to a tour execution. This may be accomplished, for example, by searching all existing tour executions to determine if this particular live load as already been assigned. The search may be accomplished by comparing a load identification of the live load to the load identifications of loads in all existing tour executions. If the load has been assigned, the method proceeds to step 608, where the tour execution already assigned to the load is returned. Otherwise, the method proceeds to step 610.

As step 610, a determination is made as to whether each tour template can be matched to the live load. The determination can be made by determining whether attributes of the live load match attributes of the tour template. In some examples, for a match to be successful, an origin and destination of the live load must match an origin and destination of the tour template. In some examples, the carrier identification of the live load must match a carrier identification of the tour template. In some examples, the day of the week for both pickup and drop off must match. In some examples, the pickup and drop off time windows must match.

At step 612, any tour templates that were matched are stored in a tour template list. At step 614, tour executions associated with the matched tour templates in step 612 are stored in a tour template list. At step 616, the tour template list, which includes the tour executions yet to be assigned, are ranked (e.g., sorted) by their fill rate. The fill rate may be the proportion of live loads matched to a particular tour template to the total number of live loads. In some examples, a tour execution with a higher fill rate is ranked above a tour execution with a lower fill rate.

At step 618, an attempt is made to assign the live load to a tour execution from the tour template list. In some examples, an attempt is made to assign the live load to the tour execution in the tour template list with the highest fill rate. If the assignment is successful, the assigned tour execution is returned in step 624. Otherwise, the method proceeds back to step 618, where the next tour execution from the tour template list is obtained to attempt an assignment in step 620.

If, at step 618, there are no more tour executions to attempt assignments to in step 618, the method proceeds to attempt the creation of a new tour execution 626 by proceeding to step 628. At step 628, if there are no more tour templates in the tour template list, the method proceeds to step 630, where an error, such as "NULL," is returned. Otherwise, the method obtains the next tour template from the tour template list at step 632.

At step 634, a determination is made as to whether the assignment of the live load to the tour execution associated with the current tour template would exceed a capacity. If the capacity would be exceeded, the method proceeds back to step 628, where a determination is made as to whether there is another tour template in the tour template list. Otherwise, if the capacity would not be exceeded, the method proceeds to step 636.

At step 636, a determination is made as to whether the tour template satisfies one or more rules. For example, one rule may be whether the tour template has already expired. Another rule may be whether the tour template will become effective at a later time (e.g., is not effective now). For example, the tour template may not be effective until a later day in the week, and therefore is not available for live loads that need to be assigned now or in the near future. If the tour template does not satisfy one or more of the rules, the method proceeds back to step 628. Otherwise, the method proceeds to step 638, where a new tour execution is instantiated. For example, a new tour execution is created for live load assignment.

Proceeding to step 640 from step 638, the method assigns the live load to the newly created tour execution. At step 642, a determination is made as to whether the assignment was successful. If the assignment was not successful, the method proceeds back to step 628. Otherwise, the assigned tour execution is returned at step 644.

Figure 7:
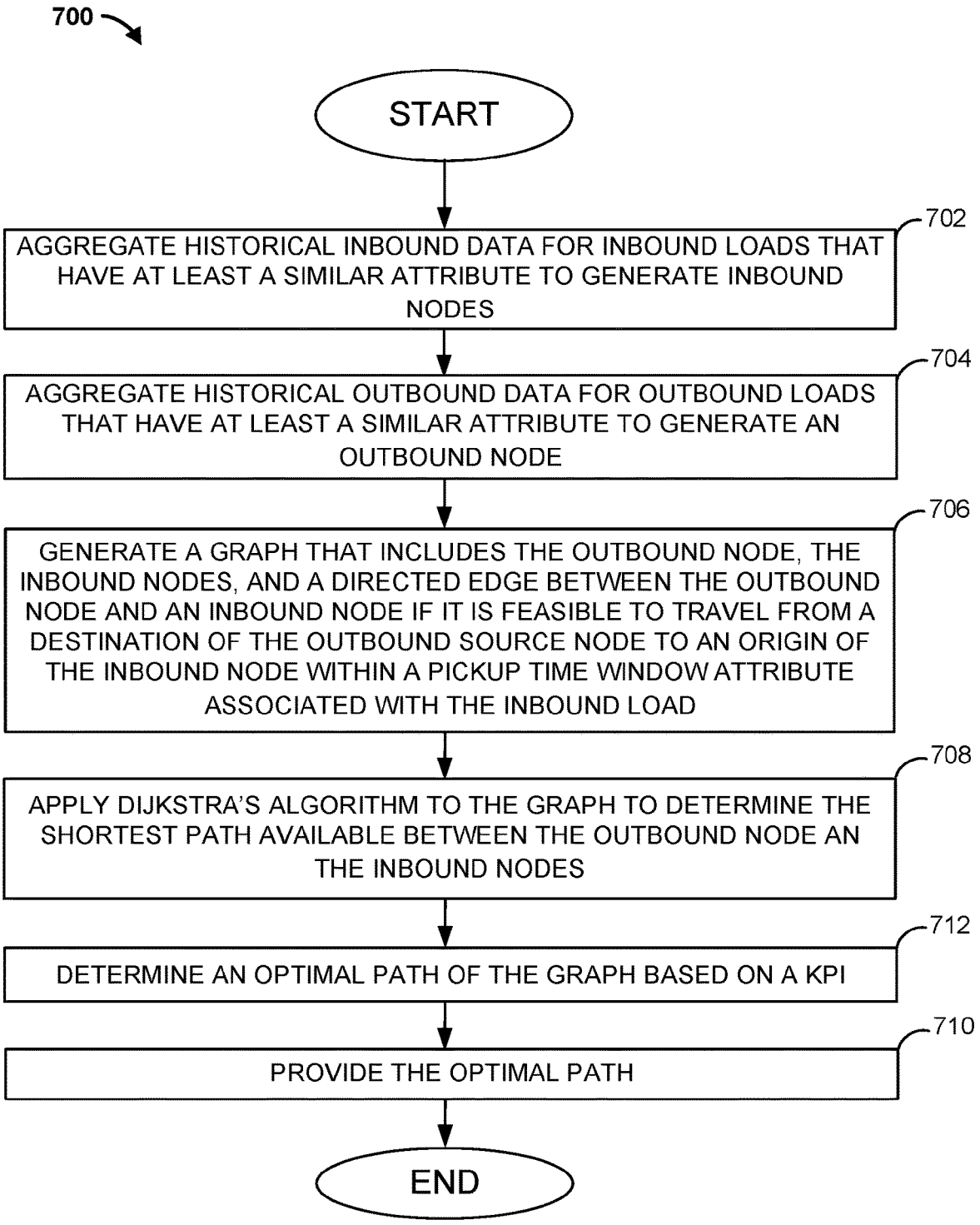
FIG. 7 is a flowchart of an example method that can be carried out by the load and route assignment computing device of FIG. 1 in accordance with some embodiments.

FIG. 7 is a flowchart of an example method 700 that can be carried out by the load and route assignment computing device 102 of FIG. 1. In some examples, the method may be implemented by the historical data based path determination module 402 of FIG. 4. At step 702, historical inbound load data for inbound loads that have at least a similar attribute is aggregated to generate inbound nodes. At step 704, historical outbound load data for outbound loads that have a similar attribute is aggregated to generate an outbound node. At step 706, a graph is generated that includes the outbound node, the inbound nodes, and a directed edge between the outbound source node and an inbound node if it is feasible to travel from a destination of the outbound source node to an origin of the inbound node within a pickup time window attribute associated with the inbound load. At step 708, Dijkstra's algorithm is applied to the graph to determine the shortest path available between the outbound node and the inbound nodes. At step 710, an optimal path is determined based on a KPI. At step 712, the optimal path is provided. For example, the optimal path may be provided to the constraints enforcement module described above with respect to FIG. 4.

Figure 8:
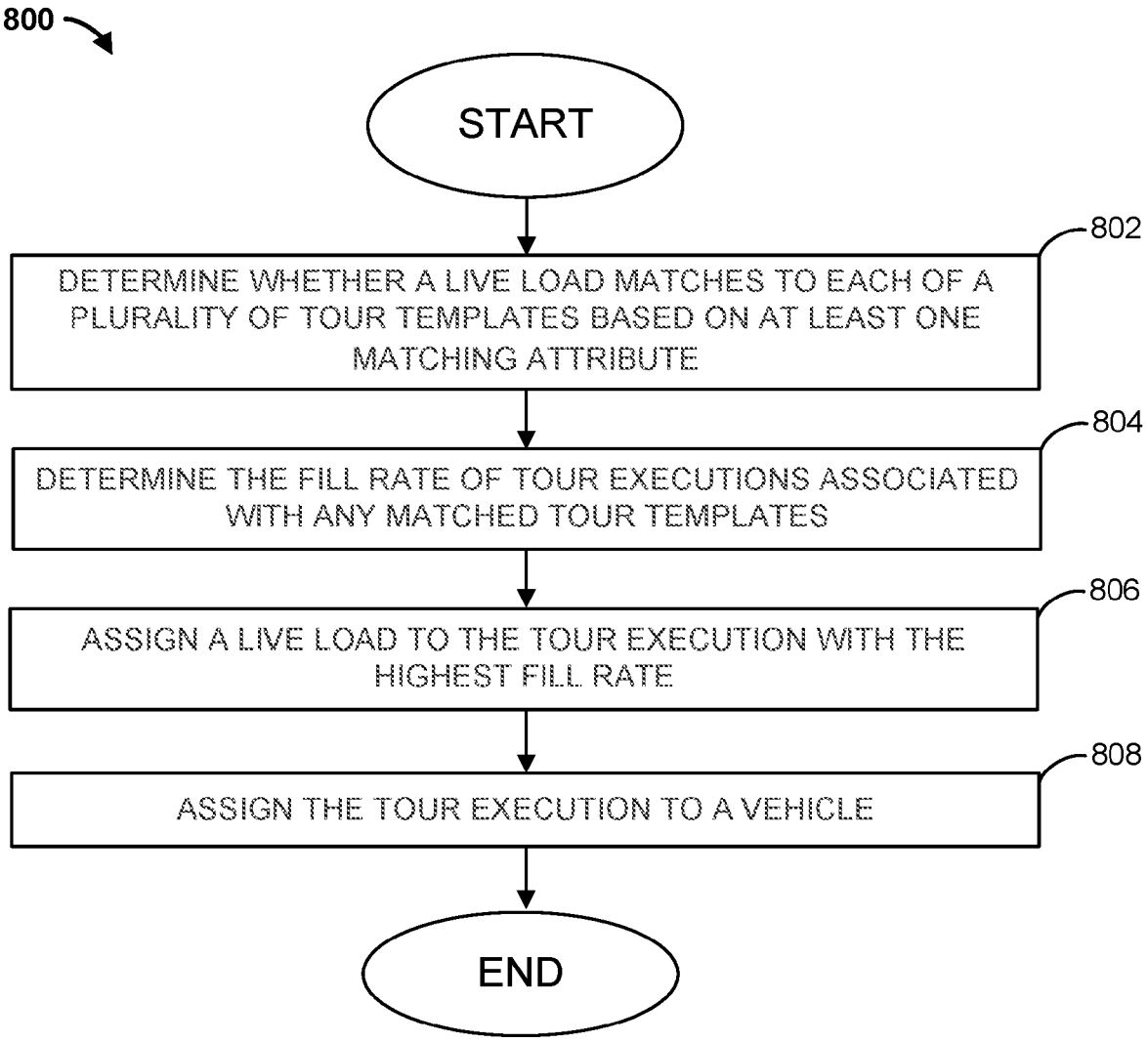
FIG. 8 is a flowchart of yet another example method that can be carried out by the load and route assignment computing device of FIG. 1 in accordance with some embodiments.

FIG. 8 is a flowchart of another example method 600 that can be carried out by the load and route assignment computing device 102 of FIG. 1. In some examples, the method may be implemented by the load matching and assignment module 410 of FIG. 4. At step 802, a determination is made as to whether a live load matches to each of a plurality of tour templates based on at least one matching attribute.

Proceeding to step 804, the fill rate of tour executions associated with the matched tour templates is determined. At step 806, the live load is assigned to the tour execution with the highest fill rate. At step 808, the tour execution is assigned to a vehicle. For example, the tour execution may be assigned to a truck to deliver goods in accordance with the live load.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A computing device comprising:

one or more processors; and a memory configured to store instructions that when executed by the one or more processors cause the computing device to:

aggregate*, within a database,* historical inbound data related to a plurality of inbound loads based on at least one similar attribute of the plurality of inbound loads [to determine] *and, based on the historical inbound data, generate inbound node data characterizing* at least two inbound nodes;

aggregate*, within the database,* historical outbound data related to a plurality of outbound loads based on at least one similar attribute of the outbound loads [to determine] *and, based on the historical outbound data, generate outbound node data characterizing* at least one outbound node;

*based on the inbound node data,* construct a first determination that there is at least a first pre-defined amount of time to travel between locations associated with the at least two inbound nodes while still satisfying at least a first time window attribute of at least one of the two inbound nodes;

[determine] *generate first edge data characterizing* at least a first directed edge between the at least two inbound nodes based on the first determination;

*based on the inbound node data and the outbound node data,* construct a second determination that there is at least a second pre-defined amount of time to travel between locations associated with the at least one outbound node and at least one of the at least two inbound nodes while still satisfying at least a second time window attribute of at least one of the at least one outbound node and the at least two inbound nodes;

[determine] *generate second edge data characterizing* at least a second directed edge between the at least one outbound node and the at least one of the two inbound nodes based on the second determination;

[determine] *generate path data characterizing* a plurality of paths between the locations associated with the at least one outbound node and the at least two inbound nodes based on the at least first directed edge and the at least second directed edge; [and determine] *generate optimal path data characterizing* an optimal path based on *the path data characterizing* the plurality of paths*;*

*generate a tour template based on the optimal path data;*

*receive, over a network, a live load for delivery;*

*generate a tour execution that assigns the tour template to the live load; and*

*store the tour execution within the database.*

2. The computing device of claim 1, wherein the at least one similar attribute of the plurality of inbound loads comprises an origin, a destination, a destination time window, and a pickup time window, wherein the *instructions, when executed by the one or more processors, cause the* computing device [is further configured] to:

determine that the origin is the same;

determine that the designation is the same;

determine that the destination time windows of each of the plurality of inbound loads overlap by a first minimum amount of time; and determine that the pickup time windows of each of the plurality of inbound loads overlap by a second minimum amount of time.

3. The computing device of claim 1, wherein the plurality of paths between the locations associated with the at least one outbound node and the at least two inbound nodes are determined by the application of Dijkstra's algorithm.

4. The computing device of claim 1, wherein the plurality of paths between the locations associated with the at least one outbound node and the at least two inbound nodes are determined based on determining that the plurality of paths satisfy at least one rule.

5. The computing device of claim 4, wherein the at least one rule comprises determining that the optimal path includes at least a minimum number of inbound and outbound loads, and no more than a maximum number of inbound and outbound loads.

6. The computing device of claim 1, wherein the optimal path is determined based on a Key Performance Indicator (KPI) of the plurality of paths.

7. The computing device of claim 6, wherein the KPI is an empty miles ratio, wherein *the instructions, when executed by the one or more processors, cause* the computing device [is configured] *to* determine that the optimal path has the lowest empty miles ratio of the plurality of paths.

8. The computing device of claim 1 [is further configured] *wherein the instructions, when executed by the one or more processors, cause the computing device* to assign the [optimal path] *tour execution* to a vehicle for execution, *and transmit, over the network, the assigned tour execution.*

9. A method by a computing device comprising:

aggregating, *within a database,* historical inbound data related to a plurality of inbound loads based on at least one similar attribute of the plurality of inbound loads [to determine] *and, based on the historical inbound data, generating inbound node data characterizing* at least two inbound nodes;

aggregating, *within the database,* historical outbound data related to a plurality of outbound loads based on at least one similar attribute of the outbound loads [to determine] *and, based on the historical outbound data, generating outbound node data characterizing* at least one outbound node;

*based on the inbound node data,* constructing a first determination that there is at least a first pre-defined amount of time to travel between locations associated with the at least two inbound nodes while still satisfying at least a first time window attribute of at least one of the two inbound nodes;

[determining] *generating first edge data characterizing* at least a first directed edge between the at least two inbound nodes based on the first determination;

*based on the inbound node data and the outbound node data,* constructing a second determination that there is at least a second pre-defined amount of time to travel between locations associated with the at least one outbound node and at least one of the at least two inbound nodes while still satisfying at least a second time window attribute of at least one of the at least one outbound node and the at least two inbound nodes;

[determining] *generating second edge data characterizing* at least a second directed edge between the at least one outbound node and the at least one of the two inbound nodes based on the second determination;

determining a plurality of paths between the locations associated with the at least one outbound node and the at least two inbound nodes based on the at least first directed edge and the at least second directed edge; [and determining] *generating optimal path data characterizing* an optimal path based on the plurality of paths;

*generating a tour template based on the optimal path data;*

*receiving, over a network, a live load for delivery;*

*generating a tour execution that assigns the tour template to the live load; and*

*storing the tour execution within the database.*

10. The method of claim 9 wherein the at least one similar attribute of the plurality of inbound loads comprises an origin, a destination, a destination time window, and a pickup time window, wherein the method further comprises:

determining that the origin is the same;

determining that the designation is the same;

determining that the destination time windows of each of the plurality of inbound loads overlap by a first minimum amount of time; and determining that the pickup time windows of each of the plurality of inbound loads overlap by a second minimum amount of time.

11. The method of claim 9 wherein determining the plurality of paths comprises determining that the optimal path includes at least a minimum number of inbound and outbound loads, and no more than a maximum number of inbound and outbound loads.

12. The method of claim 9 wherein determining the optimal path is based on a Key Performance Indicator (KPI) of the plurality of paths.

13. The method of claim 12 wherein the KPI is an empty miles ratio, wherein determining the optimal path comprises determining that the optimal path has the lowest empty miles ratio of the plurality of paths.

14. The method of claim 9 further comprising assigning the [optimal path] *tour execution* to a vehicle for execution, *and transmitting, over the network, the assigned tour execution.*

15. A non-transitory, computer-readable storage medium comprising executable instructions that, when executed by one or more processors, cause the one or more processors to:

aggregate, *within a database,* historical inbound data related to a plurality of inbound loads based on at least one similar attribute of the plurality of inbound loads [to determine] *and, based on the historical inbound data, generate inbound node data characterizing* at least two inbound nodes;

aggregate, *within a database,* historical outbound data related to a plurality of outbound loads based on at least one similar attribute of the outbound loads [to determine] *and, based on the historical outbound data, generate outbound node data characterizing* at least one outbound node;

*based on the inbound node data,* construct a first determination that there is at least a first pre-defined amount of time to travel between locations associated with the at least two inbound nodes while still satisfying at least a first time window attribute of at least one of the two inbound nodes;

[determine] *generate first edge data characterizing* at least a first directed edge between the at least two inbound nodes based on the first determination;

*based on the inbound node data and the outbound node data,* construct a second determination that there is at least a second pre-defined amount of time to travel between locations associated with the at least one outbound node and at least one of the at least two inbound nodes while still satisfying at least a second time window attribute of at least one of the at least one outbound node and the at least two inbound nodes;

[determine] *generate second edge data characterizing* at least a second directed edge between the at least one outbound node and the at least one of the two inbound nodes based on the second determination;

[determine] *generate path data characterizing* a plurality of paths between the locations associated with the at least one outbound node and the at least two inbound nodes based on the at least first directed edge and the at least second directed edge; [and]

[determine] *generate optimal path data characterizing* an optimal path based on the plurality of paths;

*generate a tour template based on the optimal path data;*

*receive, over a network, a live load for delivery;*

*generate a tour execution that assigns the tour template to the live load; and*

*store the tour execution within the database.*

16. The computer-readable storage medium of claim 15, wherein the at least one similar attribute of the plurality of inbound loads comprises an origin, a destination, a destination time window, and a pickup time window, and wherein the executable instructions, when executed by the one or more processors, cause the one or more processors to:

determine that the origin is the same;

determine that the designation is the same;

determine that the destination time windows of each of the plurality of inbound loads overlap by a first minimum amount of time; and determine that the pickup time windows of each of the plurality of inbound loads overlap by a second minimum amount of time.

17. The computer-readable storage medium of claim 15 wherein the executable instructions, when executed by the one or more processors, cause the one or more processors to determine that the optimal path includes at least a minimum number of inbound and outbound loads, and no more than a maximum number of inbound and outbound loads.

18. The computer-readable storage medium of claim 15, wherein the executable instructions, when executed by the one or more processors, cause the one or more processors to determine the optimal path based on a Key Performance Indicator (KPI) of the plurality of paths.

19. The computer-readable storage medium of claim 18 wherein the executable instructions, when executed by the one or more processors, cause the one or more processors to, wherein the KPI is an empty miles ratio, determine that the optimal path has the lowest empty miles ratio of the plurality of paths.

20. The computer-readable storage medium of claim 18, wherein the executable instructions, when executed by the one or more processors, cause the one or more processors to assign the [optimal path] *tour execution* to a vehicle for execution*, and transmit, over the network, the assigned tour execution*.

* * * * *